United States Patent
Shi et al.

(10) Patent No.: US 11,978,105 B2
(45) Date of Patent: May 7, 2024

(54) SYSTEM, METHOD, AND APPARATUS FOR PROCESSING CLOTHING ITEM INFORMATION FOR TRY-ON

(71) Applicant: Alibaba Group Holding Limited, Grand Cayman (KY)

(72) Inventors: Keyang Shi, Hangzhou (CN); Ding Sheng, Hangzhou (CN); Lin Bin, Hangzhou (CN); Jianfeng Guo, Hangzhou (CN); Shurong He, Hangzhou (CN); Didi Yao, Hangzhou (CN); Wei Feng, Hangzhou (CN); Weizhi Xie, Hangzhou (CN); Wei Zhu, Hangzhou (CN); Jianhong Wang, Hangzhou (CN); Menglei Jia, Hangzhou (CN); Xiaoying Hu, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 862 days.

(21) Appl. No.: 16/979,744

(22) PCT Filed: Apr. 1, 2019

(86) PCT No.: PCT/CN2019/080737
§ 371 (c)(1),
(2) Date: Sep. 10, 2020

(87) PCT Pub. No.: WO2019/192414
PCT Pub. Date: Oct. 10, 2019

(65) Prior Publication Data
US 2021/0042814 A1 Feb. 11, 2021

(30) Foreign Application Priority Data
Apr. 4, 2018 (CN) .......................... 201810299211.8

(51) Int. Cl.
*G06Q 30/00* (2023.01)
*G06K 7/08* (2006.01)
(Continued)

(52) U.S. Cl.
CPC ......... *G06Q 30/0631* (2013.01); *G06K 7/087* (2013.01); *G06Q 30/0185* (2013.01);
(Continued)

(58) Field of Classification Search
CPC .......... G06Q 30/0631; G06Q 30/0643; G06Q 30/0185; G07C 9/37; G06K 7/087; G06T 19/00; G06T 2200/24
See application file for complete search history.

(56) References Cited

U.S. PATENT DOCUMENTS 6,901,379 B1   5/2005   Balter et al.
8,286,887 B2   10/2012  Wilkinson
(Continued)

FOREIGN PATENT DOCUMENTS

CN   105615562 A   6/2016
CN   106557944 A   4/2017
(Continued)

OTHER PUBLICATIONS

Phulari, Shivachalappa, et al. "Fashion Accessories Using Virtual Mirror."*
(Continued)

*Primary Examiner* — Kathleen Palavecino
(74) *Attorney, Agent, or Firm* — James J. DeCarlo; Greenberg Traurig, LLP

(57) ABSTRACT

Embodiments of the disclosure disclose a store system, and a method and an apparatus for processing information of clothing items for try-on. The store system comprises: a first device, deployed in a back warehouse area of a store and configured to obtain corresponding relationship between a
(Continued)

user and information of one or more clothing items for try-on; and provide preparation prompt information based on the corresponding relationship to prepare the one or more clothing items for the user; and a fitting room, the fitting room comprising a first door and a second door, the first door configured for the user to enter and exit the fitting room, and the second door configured for delivering the one or more clothing items for try-on corresponding to the user from the back warehouse area to the fitting room.

20 Claims, 13 Drawing Sheets

(51) Int. Cl.
G06Q 30/018 (2023.01)
G06Q 30/0601 (2023.01)
G06T 19/00 (2011.01)
G07C 9/37 (2020.01)
G06V 20/20 (2022.01)
G06V 40/50 (2022.01)
H04W 4/20 (2018.01)

(52) U.S. Cl.
CPC ......... *G06Q 30/0643* (2013.01); *G06T 19/00* (2013.01); *G07C 9/37* (2020.01); *G06T 2200/24* (2013.01); *G06V 20/20* (2022.01); *G06V 40/50* (2022.01); *H04W 4/20* (2013.01)

(56) References Cited

U.S. PATENT DOCUMENTS

| 8,655,053 | B1 | 2/2014 | Hansen |
| 9,646,340 | B2 | 5/2017 | Kapur et al. |
| 9,877,531 | B2 | 1/2018 | Weaver |
| 9,990,438 | B2* | 6/2018 | Cypher ............... G06K 7/1443 |
| 10,002,337 | B2 | 6/2018 | Siddique et al. |
| 2001/0026272 | A1 | 10/2001 | Feld et al. |
| 2002/0045959 | A1 | 4/2002 | Van Overveld |
| 2002/0196333 | A1 | 12/2002 | Gorischek |
| 2004/0039592 | A1 | 2/2004 | Shima |
| 2004/0098137 | A1 | 5/2004 | Hollemans |
| 2005/0055361 | A1 | 3/2005 | Deal |
| 2009/0210320 | A1 | 8/2009 | Adelman et al. |
| 2010/0030578 | A1 | 2/2010 | Siddique et al. |
| 2013/0334309 | A1 | 12/2013 | Shouraboura et al. |
| 2014/0058880 | A1 | 2/2014 | Konaxis |
| 2014/0379532 | A1* | 12/2014 | Agasti ............... G06Q 30/0641 705/27.1 |
| 2015/0154691 | A1 | 6/2015 | Curry et al. |
| 2018/0182016 | A1* | 6/2018 | Giampaolo ........ G06Q 30/0641 |
| 2019/0035149 | A1 | 1/2019 | Chen et al. |

FOREIGN PATENT DOCUMENTS

| CN | 107220886 A | 9/2017 |
| CN | 107341711 A | 11/2017 |
| GB | 2376385 A | 12/2002 |
| KR | 1020070106880 | 11/2007 |
| KR | 1020110083831 | 7/2011 |
| KR | 1020150072482 | 6/2015 |
| KR | 1020150130674 | 11/2015 |
| KR | 1020170060740 | 6/2017 |
| WO | 0250736 A1 | 6/2002 |

OTHER PUBLICATIONS

International Search Report to corresponding International Application No. PCT/CN2019/080737 dated Jul. 3, 2019 (2 pages).
Extended European Search Report to corresponding EP Application No. 19780784.5 dated Nov. 4, 2021 (9 pages).

* cited by examiner

SYSTEM, METHOD, AND APPARATUS FOR PROCESSING CLOTHING ITEM INFORMATION FOR TRY-ON

CROSS-REFERENCE TO RELATED APPLICATIONS

The present application is a national stage entry of Int'l Appl. No. PCT/CN2019/080737, filed on Apr. 1, 2019, which claims priority to Chinese Patent Application No. 201810299211.8, filed on Apr. 4, 2018, both of which are incorporated herein by reference in their entirety.

BACKGROUND

Technical Field

The disclosure relates to the field of information processing technologies, and in particular, to store systems, as well as methods and apparatuses for processing information of product items (e.g., clothing item) for try-on.

Description of Related Art

In stores, retail products such as clothing and the like, fitting rooms are usually provided for customers. As such, after a customer picks out a clothing item of interest from a display area in a store, the customer may bring the items into a fitting room to see how the clothing item fits, and then decide whether to purchase and which item or items to purchase. However, such a conventional fitting room solution has at least the following problems.

First, given its limited floor space, generally only sample clothing items are on display in the display area. For the same model of clothing item, a limited number of samples are displayed at a time. Sometimes, a single sample is on display as a result of which, when a customer brings a clothing item from the display area to the fitting room for try-on, the sample of this clothing item is no longer to be found in the display area. In this case, this particular clothing item misses being seen by customers browsing subsequently, thus missing an opportunity to be selected or purchased by other customers.

Second, a model of clothing items usually is associated with different SKUs (Stock Keeping Units) (e.g., different colors, different sizes). When selecting clothing items for try-on, a customer usually needs to select a specific color and size. If the floor sample items in the display area do not meet the user's try-on needs, a salesperson needs to search the items of the desired SKUs in the warehouse, and then deliver them to the customer for try-on. This process requires the customers to wait, which may upset some customers to the extent that they lose interest in the items during the wait, and so on.

Thus, there exists a technical problem of how to provide a more intelligent merchandise try-on solution for products such as clothes, shoes, handbags, accessories, and the like (collectively referred herein as "clothing items").

SUMMARY

The disclosure provides store systems, and methods and apparatuses for processing information of clothing items for try-on to enhance the rate of being browsed by users, and try-on efficiency for clothing items.

In one embodiment, the disclosure provides a store system, comprising: a first device, deployed in a back warehouse area of a store and configured to obtain the corresponding relationship between a user and information of one or more clothing items for try-on and to provide preparation prompt information based on the corresponding relationship to prepare the one or more clothing items for the user; and a fitting room, the fitting room comprising a first door and a second door, the first door configured for the user to enter and exit the fitting room, and the second door configured for delivering the one or more clothing items for try-on corresponding to the user from the back warehouse area to the fitting room.

In one embodiment, the disclosure provides a fitting room, the fitting room comprising a first door and a second door, the first door configured for a user to enter and exit the fitting room, and the second door configured for delivering clothing items for try-on corresponding to the user from the back warehouse area to the fitting room.

In one embodiment, the disclosure provides a method for processing information of clothing items for try-on, the method comprising: obtaining, by a first device, a corresponding relationship between a user and information of one or more clothing items for try-on; and providing preparation prompt information based on the corresponding relationship to prepare the one or more clothing items for the user, and delivering the one or more clothing items for try-on into a fitting room via a second door of the fitting room, the fitting room further comprising a first door configured for a user to enter and exit the fitting room.

In one embodiment, the disclosure provides a method for processing information of one or more clothing items for try-on, comprising: receiving, by a second device, a notification signal transmitted by a short-range signal generator associated with a clothing item in a display area, the notification signal configured for notifying a movement of the associated clothing item; caching the recently received identifiers of the moved clothing items; determining a user to provide a list of the recently moved clothing items to the user; and determining the one or more clothing items for try-on based on a selection performed by the user on the clothing items in the list.

In one embodiment, the disclosure provides a method for processing information of one or more clothing items for try-on, the method comprising: determining, by a third device, identification information of a user entering a fitting room; requesting, from a server, information of the one or more clothing items for try-on corresponding to the user based on the identification information; and displaying the information of the one or more clothing items for try-on at a display screen.

In one embodiment, the disclosure provides a method for processing clothing item information, the method comprising: obtaining, by a server, a corresponding relationship between identification information associated with a user and one or more clothing items for try-on selected in a store; and upon receiving the identification information of the user, submitted by a third device in a fitting room of the store, returning information of the corresponding one or more clothing items for try-on, the information of corresponding one or more clothing items being displayed at a display screen of the third device.

In one embodiment, the disclosure provides an apparatus for processing information of one or more clothing items for try-on, applied to a first device, the apparatus comprising: a corresponding relationship obtaining unit configured to obtain the corresponding relationship between a user and information of one or more clothing items for try-on; and a prompt information providing unit configured to provide preparation prompt information based on the corresponding relationship to prepare the one or more clothing items for the user, and deliver the one or more clothing items for try-on into a fitting room via a second door of the fitting room, the fitting room further comprising a first door configured for a user to enter and exit the fitting room.

In one embodiment, the disclosure provides an apparatus for processing information of clothing items for try-on, applied to a second device, the apparatus comprising: a notification signal receiving unit configured to receive a notification signal transmitted by a short-range signal generator that is associated with a clothing item in a display area, the notification signal configured for notifying a movement of the associated clothing item; a caching unit configured to cache the recently received identifiers of the moved clothing items; an information providing unit configured to determine a user and provide a list of information of the recently moved clothing items to the user; and an information determining unit configured to determine one or more clothing items for try-on based on a selection performed by the user on the clothing items in the list.

In one embodiment, the disclosure provides an apparatus for processing information of clothing items for try-on, applied to a third device, the apparatus comprising: an identification information determining unit configured to determine identification information of a user entering a fitting room; a clothing item information obtaining unit configured to obtain, from a server, information of one or more clothing items for try-on associated with the user based on the identification information; and a clothing item information display unit configured to display the information of the one or more clothing items for try-on at a display screen.

In one embodiment, the disclosure provides an apparatus for processing clothing item information, applied to a server, the apparatus comprising: a corresponding relationship obtaining unit configured to obtain a corresponding relationship between a user identifier of a user and one or more clothing items for try-on selected in a store; and a clothing item information providing unit configured to, upon receiving user identification information submitted by a third device in a fitting room of the store, return the information of corresponding one or more clothing items for try-on, the information corresponding one or more clothing items being displayed at a display screen of the third device.

In one embodiment, the disclosure provides a computing system, the computing system comprising: one or more processors; and a memory coupled to the one or more processors, wherein the memory is configured to store program instructions that, when read and executed by the one or more processors, instruct the computing system to perform the following operations: receiving a notification signal transmitted by a short range signal generator that is associated with a clothing item in a display area, the notification signal configured for notifying a movement of the associated clothing item; caching recently received identifiers of moved clothing items; determining a user and providing a list of information of recently moved clothing items to the user; and determining one or more clothing items for try-on based on a selection performed by the user on the clothing items in the list, and establishing a corresponding relationship between the user and the information of the one or more clothing items for try-on, the corresponding relationship configured to be provided to a first device in a back warehouse of a store to prepare the one or more clothing items, a result of which has the one or more clothing items delivered to a fitting room via a second door of the fitting room.

Various embodiments of the disclosure provide the following improved technical effects.

After clothing items for try-on are confirmed in a display area, the information of these clothing items is sent to a first device in a back warehouse area such that a back warehouse system is triggered to prepare these clothing items. Further, a fitting room is configured with two doors, one for entrance and exit by a user, and the other for delivering clothing items for try-on. This way, as clothing items in the display area are not to be brought into the fitting room directly by a user (e.g., a customer), the clothing items remain to be seen by other users browsing subsequently, without the need to increase the number of floor samples in the display area. Furthermore, with staff in the back warehouse dedicated to item preparations, a salesperson in the front store does not need to help users to find the desired colors, sizes, and so on, thereby achieving higher efficiency.

Embodiments of the disclosure do not necessarily require all of the advantages described above to be achieved at the same time.

BRIEF DESCRIPTION OF THE DRAWINGS

The drawings for the description of the embodiments are briefly introduced below. The drawings in the following description are some embodiments of the disclosure. Those of ordinary skill in the art can also obtain other drawings based on these drawings without significant efforts.

DETAILED DESCRIPTION OF THE EMBODIMENTS

The technical solutions in the embodiments of the disclosure will be clearly and completely described below with reference to the drawings in the embodiments of the disclosure. The embodiments described herein are merely some, rather than all, of the embodiments of the disclosure. All other embodiments obtained by those of ordinary skill in the art based on the embodiments of the disclosure shall fall within the scope of the disclosure.

Embodiments of the disclosure provide a more intelligent store system, enable a more efficient try-on process for users, and increase an exposure rate to browsing users. In some embodiments, in a store, a back warehouse and a fitting room are "connected" such that a user can select clothing items for try-on in a display area of the store, but does not need to manually bring the clothing items to the fitting room. Instead, an information system in the store transfers the information of the clothing items selected for try-on to a first device in the back warehouse, after which an operator in the back warehouse prepares and delivers such clothing items to the fitting room. Since clothing items in the display area are not to be brought into the fitting room directly by a user, the clothing items remain displayed to other users browsing later on, without the need to increase the number of floor samples in the display area. Further, higher efficiency is achieved since back warehouse operators can focus on items preparations, and salespersons in the store front no longer need to help users to find items of the desired colors, sizes, and so on.

Figure 1:
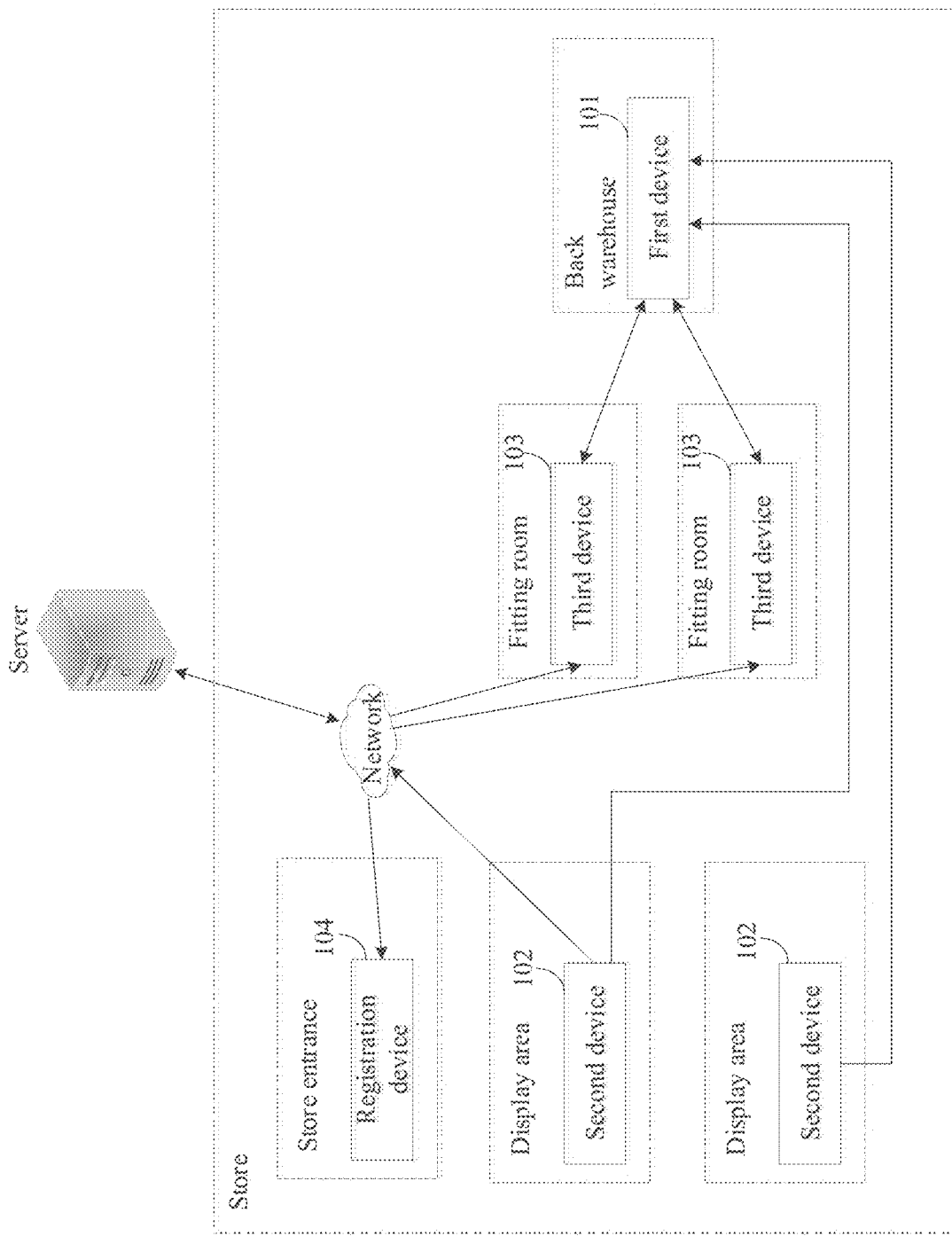
FIG. 1 is a block diagram illustrating a system architecture according to some embodiments of the disclosure.

FIG. 1 illustrates an example of a store system architecture according to some embodiments of the disclosure. In some embodiments, the store system includes a first device (101) and a fitting room (103).

The first device (101) is deployed in a back warehouse area of a store and configured to obtain a corresponding relationship between a user and information of one or more clothing items for try-on and to provide preparation prompt information based on the corresponding relationship to prepare the one or more clothing items for the user.

The fitting room (103) comprises a first door and a second door. The first door is configured for the user to enter and exit the fitting room. The second door is configured for delivering the one or more clothing items for try-on corresponding to the user from the back warehouse area to the fitting room.

In some embodiments, any suitable techniques can be applied to select clothing items for try-on and to transfer the corresponding relationship between the user and information of the clothing items for try-on. For example, a user selects clothing items in a conventional manner and then takes the clothing items to the front desk of the store. The front desk staff then enters the clothing item information, and obtains the user identification information of the user by scanning a code (e.g., scanning a graphic code representing an account on a corresponding client at a device of the user), or inputting the membership card information, etc. Afterwards, a device of the front desk transfers a corresponding relationship between the user and the clothing items to the first device in the back warehouse. In some implementations, this approach may be of low efficiency, when many users are in the store, the efficiency of the front desk staff becomes a bottleneck, causing users to wait in line.

In some embodiments, the user accesses an online sale system associated with the store via a device (e.g., a mobile phone). After finding a clothing item in the store that he/she wants to try on, the user finds the corresponding product object at the device, and initiates a try-on request through a corresponding operable option. As such, a server system is caused to transfer a corresponding relationship between a user identifier of the user and information of the clothing item for try-on to the first device in the back warehouse of the physical store.

The above-described approach enables the user to directly submit information on clothing items for try-on, but requires the user to perform operations at a mobile device (e.g., a mobile phone). In some scenarios, the operations may still lack convenience, with information being transferred along a long network path. Further, when a large number of users are present at the store, situations of delays, or the like, in transferring the information occur due to the limited wireless network resources at site.

In some embodiments, and as shown in FIG. 1, a second device (102) is provided in the store system. The second device (102) is deployed in a clothing item display area of the store, and configured to identify the user and determine the information corresponding to the clothing items to be tried on by the user. In implementations, for a plurality of display areas, a plurality of respective second devices (102) are deployed. Although only two second devices (102) are shown in FIG. 1, any number of second devices (102) can be deployed and configured without limitation.

In this example, the information of items for trying on by a user is determined via the second device (102) deployed in the store. As the second device (102) is deployed in the display area, the user not only can get a sense of the texture of clothing items by examining the clothing samples displayed in the display area but also can select from the information corresponding to the clothing items for display at the nearby second device (102). This way, the corresponding relationship between the user identifier and clothing items selected for try-on is transferred to the first device (101) from the second device (102). Since both the first device (101) and the second device (102) are located inside the store, such information is transferred over local communication networks, resulting in enhanced convenience and efficiency. In other embodiments, the user only selects clothing items for try-on at the second device (102), and the above-described corresponding relationship is transferred to the first device (101) in the back warehouse in other manners, the details of which are described below.

Any suitable techniques can be applied to allow users to select for items to try on at the second device (102). For example, a list of information corresponding to selectable clothing items in the store is displayed on a display screen of the second device (102). After a user determines the clothing items for trying by browsing the clothing samples displayed in the display area, the product information corresponding to the selected items are selected from the list displayed in the second device (102). Afterwards, via the operation of a user interface option (e.g., "Add to Fitting Cart"), the clothing items corresponding to the selected product information are determined as the clothing items for try-on.

The above-described approach enables the basic functionalities of selecting information corresponding to the clothing items for try-on. However, since the user needs to search, by himself/herself, the product information list for the information corresponding to clothing items for try-on, the process may be time-consuming. When a large store stocks a large number of clothing items, it is more difficult to find the product information corresponding to clothing items selected for trying. Although functionalities such as classifications, queries and searches can be provided, the remedial effect is limited.

In some embodiments, to more conveniently and quickly determine the product information corresponding to the clothing items for try-on by the user, and to better the intelligent design of the store system, the following describes another improved solution. First, clothing samples displayed in the display area of the store are usually tethered with magnetic security tags. The magnetic security tags are used for the sake of security to prevent incidents such as store theft. According to various embodiments, improvements are made on magnetic security tags. In one embodiment, a magnetic security tag is provided with a motion sensor (e.g., a gyroscope), and a short-range signal generator (e.g., a Bluetooth module). As used herein, Bluetooth refers to a standardized short-wavelength communication protocol including, but not limited to, a protocol defined by IEEE 802.15.1 or similar standards, including any standards promulgated by the Bluetooth Special Interest Group of Kirkland, Wash. This way, with a clothing item being stationary while displayed in the display area, the Bluetooth module does not send a signal. However, if a user is interested in a clothing item in the display area, the user may take the clothing item down from the display rack, and perform actions such as taking a full examination of the item. At this time, the gyroscope senses the action and sends a signal through the Bluetooth module, the signal, including the information corresponding to the clothing item tagged. Further, a short range signal receiver is further configured at the second device (102) such that when a Bluetooth module associated with a clothing item sends a signal, the second device (102) detects the signal and obtain the information about which particular clothing item has been moved.

In implementations, if clothing items in the display area are displayed at hangers arranged in parallel, the clothing items are displayed in overlap with each other. As such, the user may touch all of the clothing items on hangers in the display area to get a full view of the clothing items. In doing so, when particularly interested in a clothing item, the user takes the clothing item down for a closer look, and so on. In this case, due to the high sensitivity of the gyroscope, slight touches of the clothing items are sensed. However, not all are to be regarded as objects the user would like to try on for notification to the second device (102). To this end, in implementations, an algorithm is pre-configured to determine a motion magnitude and a motion trajectory for a clothing item based on a sensed result of the gyroscope. It is only determined that a clothing item is taken off the display rack based on that certain features (e.g., pre-configured features) are present. At this point, it is determined that the user indeed intends to try the clothing item; thus, the second device (102) is duly notified.

In some embodiments, after receiving the notification information, the second device (102) is configured to cache the corresponding clothing item identification information. For instance, the user takes down a plurality of clothing items for viewing in the display area; and other users also take down clothing items for viewing in the same display area during the same time, and so on. At this point, the second device (102) need not make any distinction and instead caches them collectively as clothing items recently moved or recently taken down from display racks.

After the user finishes viewing the clothing items in the display area, the user confirms the clothing items for try-on at the second device (102). After the identification information of the user who currently needs to perform a confirmation operation is determined, a list of identifiers associated with the moved clothing items currently cached is displayed such that the user confirms the clothing items for try-on based on the list. As such, since the list displays only the clothing items that have recently been moved, or recently been taken down from the racks for close viewing, and so on, most of the clothing items that have not been viewed are filtered out, allowing the user to confirm the clothing items for try-on from a smaller-sized list.

In one embodiment, to determine the identification information of the user confirming the clothing items for try-on, the second device (102) is further configured with a user biometric information collection apparatus. For example, the user biometric information collection apparatus includes a camera configured to perform facial recognition, a fingerprint collector, a voiceprint collector, an iris information collector, and the like. After the biometric information of a user is collected, it is confirmed that the user needs to perform a confirmation operation on the clothing items for try-on. In one embodiment, a camera is used for implementation. Further, the second device (102) is further configured with a proximity sensor. Once the proximity sensor detects that a user is approaching, the camera is triggered to collect the complete facial information, as long as the user stays sufficiently long, and it is determined that the particular user needs to confirm the clothing items for try-on and the like. Further, with the biometric information collected, the second device is further configured to, in turn, determine the identification information of the user. As used herein, the identification information refers to the identity information such as an account obtained by the user after pre-registering with a server of a system, which belongs to an online sale system, or the like, in a cooperative relationship with the store. Typically, the online system adopts authentications based on the real names of the users. During such real-name authentication, the user submits the biometric information, including the facial information, and the like. As such, the second device (102) is configured to query the corresponding server using the collected biometric information to obtain the corresponding user identification information. This way, the identification information (e.g., the account registered by the user with the online sale system) is obtained in the store. Further, in the process of selecting or trying on clothing items in the store, online payment is made using the information of the account at any time. That is, although the user selects and tries on clothing items in the physical store, the actual payment operation is completed online, further saving transactional time. Furthermore, after the online payment is made, the user is provided with the option to pick up the purchased products directly from the store, or have them delivered to a designated address by mail or the like.

In implementations, the same user may register for a plurality of accounts. If determined directly based on the identified biometric information, such biometric information may correspond to a plurality of user accounts. Therefore, one account needs to be determined from the multiple user accounts for subsequent operations, such as payment transactions. Further, since the facial information or the like submitted by the user during the real-name authentication may differ from the information collected at the moment, inaccurate identification may occur. Further, some users may not perform a real-name authentication in advance, or the like, causing the second device to fail to identify the corresponding user identification information. Thus, to better associate the users visiting the store in an offline manner with the online user identification information in a one-to-one manner, as shown in FIG. 1, a registration device (104)

is further deployed at the entrance of the store. The registration device (104) is configured to collect the biometric information of the users and the user identification information. The registration device (104) is also configured to associate the biometric information with the user identification information. In one embodiment, the registration device (104) is configured to with a biometric information collecting device, including, for example, a code scanner, a camera, and on the like. This way, before entering the store, a user first activates a respective app at a client device to locate a graphic code (or the like) embedding the specific account information. Next, the user scans the code at the scanning device of the registration device (104) such that the user identification information is obtained. On the other hand, a camera is configured to collect a facial image of the user, which is associated with the user identification information obtained from the above-described scanning result. The association relationship information is then provided to the second device (104) such that the second device (102) is configured to store the association relationship information locally, and so on. Any suitable techniques beside facial recognitions are applicable to collect biometric information, without limitation.

Figure 2A:
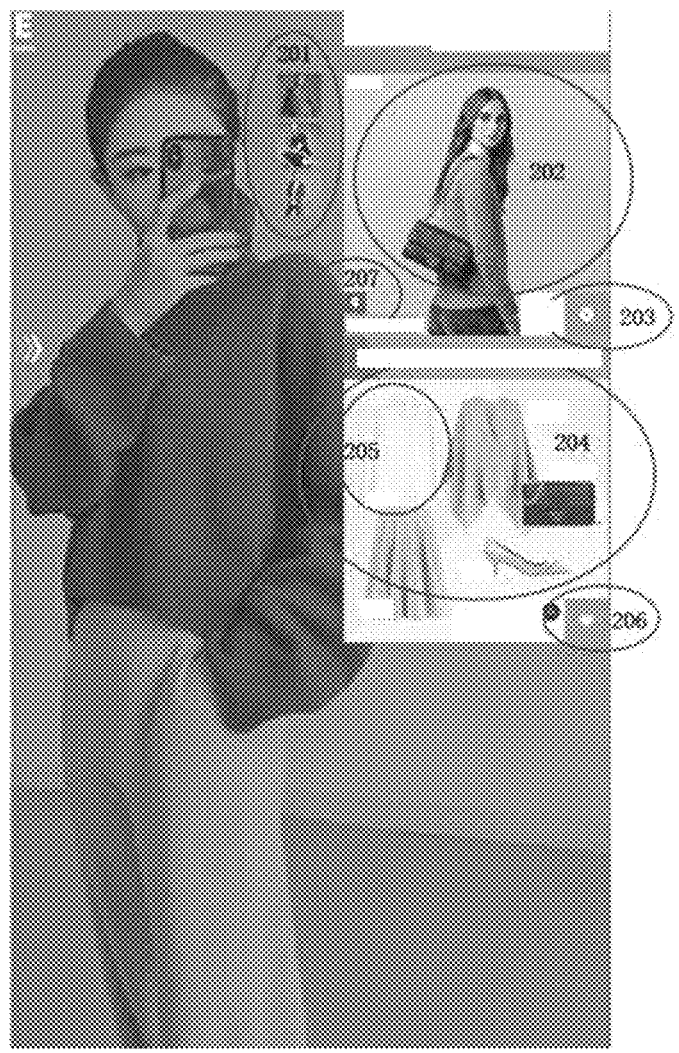
FIG. 2A is a block diagram illustrating an interface of a second device according to some embodiments of the disclosure.
Figure 2B:
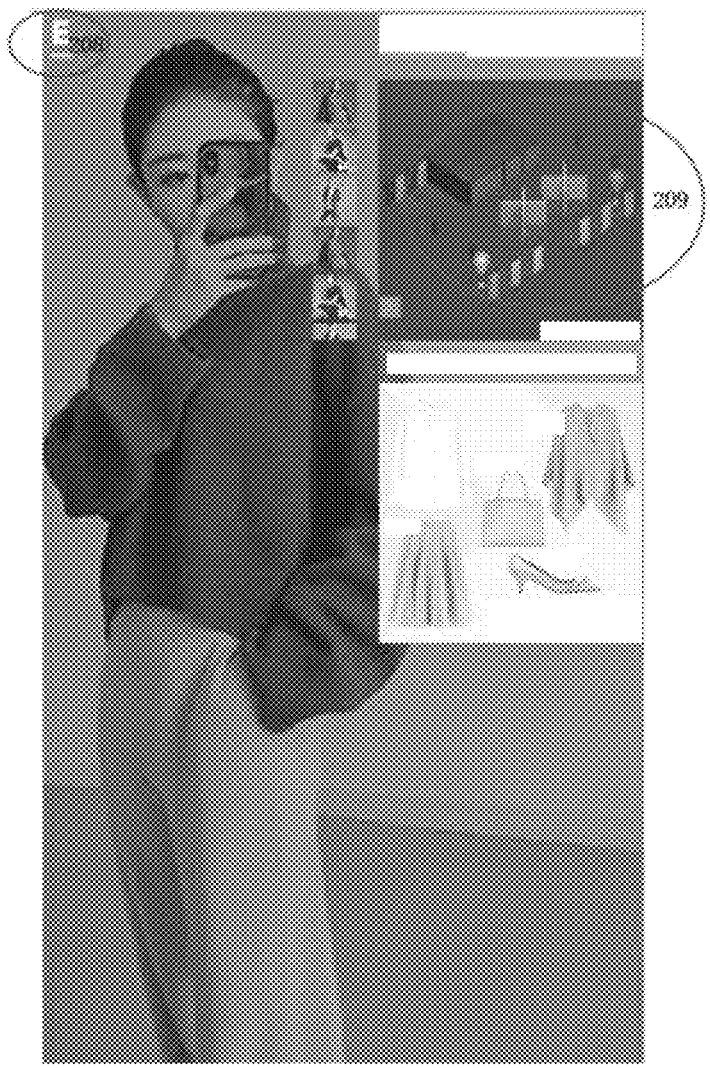
FIG. 2B is a block diagram illustrating an interface of the second device according to some embodiments of the disclosure.

FIGS. 2A-B are block diagrams illustrating user interfaces of a second device according to some embodiments of the disclosure. As described above, the second device in the display area is configured to acquire information in two aspects. The first is the user identification information of a user who currently performs operations in front of the second device. The second is a list of the information corresponding to the clothing items in the associated display area which have been moved or taken down from racks before the user came to the second device. This way, the user is allowed to select the clothing items for try-on from such list of the clothing items. For example, as shown in FIG. 2A, an area 201 of the user interface is configured to display the clothing item information of a list as a thumbnail corresponding to each clothing item. Upon the user's selection of a particular item from the list, an enlarged image is displayed in area 202 of the user interface. Moreover, in area 203 of the user interface, the price information, discount information, and the like, corresponding to the selected item is further displayed. Further, an operable option such as "Add to Fitting Cart" is further provided at the user interface such that the user can select the option to add the corresponding clothing items to a collection of information of the clothing items for try-on.

Typically, a certain model of clothing comes in a variety of colors and/or sizes. When selecting a clothing item for try-on, the user further selects the specific information regarding the color and/or size for the back warehouse to make accurate item preparation. At this point, the second device is further configured to provide an operable option for adding a clothing item selected from the clothing item information list to the collection of clothing items for try-on. After an adding request is received via the operable option, the second device is configured to provide options corresponding to the selectable colors and/or sizes, and add the selected color and/or size to the information corresponding to the clothing items for try-on. In implementations where the second device is configured with a camera, information such as a height and physical characteristics (e.g., skin tone, body type, and the like) of the user is further collected. Based on the collected information, recommendations in color and/or size are provided such that the user determines the needed color and/or size information more quickly. In one embodiment, the recommended size information is further confirmed with the reference to the historical shopping information associated with the user and saved in a server. As to the color information, a color scheme preferred by the user is analyzed by the server in advance based on the shopping history information of the user, user profile information, and so on. As such, information such as the recommended color is also confirmed based on an analysis result of the server, and so on. Further, information such as the height and physical characteristics of the user collected by the second device is further provided to other relevant services, for example, provided to a third device in the fitting room so that the third device is configured to adjust amenities such as lighting accordingly, and so on, the details of which are described below.

Further, in the process of the user selecting for the clothing items for try-on at the second device, the second device is further configured to provide recommended matching information for the user. For example, as shown in area 204 of the user interface of FIG. 2A, after the user selects a clothing item at the second device, information of other clothing items matching (e.g., go well with) the clothing item is further be provided and displayed. As shown herein FIG. 2A, a clothing item that matches the selected clothing item is shown at an area 205. As shown herein, a plurality of matching product items are recommended in area 205. Further, in one example, an operable option 206 is provided for saving a recommended matching scheme to the user's "Favorites."

According to various embodiments, information of the matching clothing items originates from a plurality of sources. For example, one source is the other clothing items available in the store, namely, clothing items in the store that match the selected clothing item. This way, if interested in one of the matching clothing items, the user further examines the physical matching items in the store, manually feel the texture, or the like, of the recommended items. In implementations, the second device is further configured to pre-record the positions of clothing items in a map such that the user is further provided at the second device with the map information for viewing the positions of the display areas where the clothing items are located.

In the example shown in FIG. 2A, a operable option 207 is configured at the user interface. Any map marker or suitable user interface element can be used to implement the operable option 207, as long as it indicates an operation pertaining to a map. In some examples, the operable option is displayed as a text of "View Map." This way, the user, when interested in one of the recommended matching clothing items and needs to view the physical items at the display area, the user clicks on the recommended clothing item to display in the area 202 the details (e.g., an enlarged image, the price information, and so on) of the matching clothing item. Further an operable option 207 for viewing a map is displayed, upon the selection of which the user obtains the map information about the position of the matching clothing item in the store.

FIG. 2B is a block diagram illustrating a user interface upon the user selects the operable option 207 of FIG. 2A to locate a recommended matching item, according to some embodiments of the disclosure. In this example, and as shown herein, the identification information of a display area, shown at an area 208 of the user interface, is indicated as a display area E. That is, in the case that the display area has multiple sub-areas, the sub-areas are separately labeled. Here, the labeling information indicates the display area where the matching clothing item is located. Further, the corresponding location information of the matching clothing item in the display area is further shown at an area 209 of the user interface such that the user can quickly find the matching clothing item directly based on a prompt (e.g., map pins) visualized in the area 209.

Any suitable techniques can be applied to recommend matching items to the user. In some embodiments, in the process of confirming clothing items for try-on at the second device, if interested in a recommended matching clothing item in the store, the user needs to leave the current position and go to the position of the matching clothing item is displayed. As such, the current state of the second device is set to a suspended state. At this point, the information related to the user is temporarily hidden at the interface of the second device. Upon detecting that another presence of a user in front of the second device, it is first determined whether the user is the same user who puts the second device in the suspended state. If so, the second device is configured to continue to display the information related to the user. Otherwise, the second device is configured to display prompt information such as "The previous user has not completed the confirmation session. Please wait." In implementations, a plurality of display areas are provided in the store and configured with respective second devices. Thus, if the user is currently in a display area A, and a selected matching clothing item is in a display area E, a Bluetooth signal of the clothing item is triggered and sent to the second device of display area E when the user takes down the item for viewing in display E. However, the user can still return to display area A to continue the confirmation operation on clothing items for try-on. For example, the user confirms the item for try-on with a selection performed at the second device of display area A. In some embodiments, if the second device in display area E is currently not used, such confirmation is made at the second device in display area E. In some other embodiments, to enhance its usability, the second device in display area A is configured to further submit the information related to and partially confirmed by the user to a server when the user leaves in the middle of confirming items for trying. As such, when the user confirms at the second device in display area E, the information upon which the user has operated at the second device in display area A is obtained through the server, and displayed at the second device in display area E. This way, the user continues the operation at the second device in display area E, and the second device in display area A is notified to change to a not-in-use state, and so on.

In some embodiments, a source for recommending matching clothing items to the user includes the clothing items purchased in the past. Those clothing items matching the currently selected clothing items are recommended to the user and displayed at the second device. This way, although not able to try on such matching clothing items in the store, the user is notified that the clothing item currently being considered in the store matches certain clothing items already purchased, which helps the user make purchasing decisions. The information of the historically purchased clothing items includes the clothing items the user purchased through a server of an online sale platform in the past, clothing items browsed and ordered directly online, or clothing items purchased in offline, physical stores co-operating with the online sale platform system, or the like. Based on information such as a user identifier of the current user, the information of the historically purchased clothing items is queried from a corresponding server.

In the above-described solution of providing a recommended matching collocation, after the user selects a clothing item in the store, other clothing items in the store or clothing items from the historically purchase by the user, that match the selected clothing item are recommended to the user. Further, the second device is further configured to provide, based on the clothing items historically purchased by the user, the information of clothing items that match the historically purchased clothing items from clothing items displayed in the store. That is, in the process that the user browses the information of the currently selected clothing item in the store at the second device, other clothing items in the store are further recommended to the user if these clothing items match a clothing item that the user has purchased. This way, the user obtains more information such that, if the user is interested in one of the matching clothing items, the user further views such items in detail; if the user has not viewed the clothing item already, the user goes to the corresponding position to check out the recommended items based on the map information to determine whether to try it on and the like.

According to various embodiments, information about clothing items for try-on is provided to the user in any suitable manner. After the user confirms the selection of the clothing items for try-on, a request for try-on in a fitting room is directly initiated based on an operable option such as a "Try on" user interface element provided at the second device. At this point, the second device is further configured to provide the identity of the user and the information of the clothing items for try-on to the first device based on the request for the fitting room submitted by the user. As such, the back warehouse is notified to prepare the items selected for trying. Further, the second device is configured to provide an operable option for checking out the selected clothing items. This way, when a check-out operation request is received via the option, a graphic code for payment is requested from a corresponding server such that the user is allowed to make a payment by scanning the graphic code at a client corresponding to the server. That is, the user is allowed to further make payments directly at the second device before trying on the items.

In some embodiments, after selecting the clothing items for try-on at a second device, when the user does not yet want to enter the fitting room but instead wants to continue browsing other clothing items in other display areas, the information of the selected clothing items for try-on is submitted to the server via an operable option (e.g., a "Save" option of the user interface of the second device,). This way, the server is configured to temporarily store the specific information of the confirmed clothing item selections for try-on. After completing browsing and deciding to enter the fitting room to try the clothing items, a try-on request is submitted. In one embodiment, at this point, the request is sent via the last second device used by the user. In other embodiments, to enable the user to initiate a try-on request at any time more conveniently, the second device is further configured to submit a corresponding relationship between an identity of the user and the clothing items for try-on to the server for saving. In one example, the server includes a registration server configured to register the user and provide the identification information of the user. Further, the store system further includes the following components.

In one embodiment, a first electronic identification card read/write device is deployed at an entrance of the store, and a plurality of electronic identification cards are also presented at the entrance. The first electronic identification card read/write device is configured to obtain the identification information of the user (e.g., by receiving a scanning result submitted from a code scanner), and write the identification information to one of the electronic identification cards, which are provided to the user for carrying around in the store. That is, when the user enters the store, a card is distributed to the user, the card storing the identification information of the user. Further, the store is configured to include a second electronic identification card read/write device, deployed at an entrance of the fitting room area. The second device is configured to read the information from the electronic identification card carried by the user to determine the identification information of the user. The second device is also configured to obtain information of the clothing items confirmed for try-on from the server, and provide the user's identification information and the information of the clothing items for try-on to the first device such that the back warehouse is notified to prepare the clothing items. That is, since the user carries with him/her the electronic identification card including the corresponding identification information, after the clothing items for try-on are selected, a request for try-on in the fitting room is initiated at any time by swiping an electronic card, leading to enhanced user try-on experience.

In some embodiments, the electronic identification card is further provided with a short-range signal transmitting device (e.g., a Bluetooth device), which is configured to transmit signals including the identification information of the user after being written. The store system is further configured with short-range signal receiving devices, which are deployed at a plurality of positions in the store in a scattered manner. This way, the indoor positioning of the user is performed based on the signals transmitted by the electronic identification card. The indoor positional information of the user is used for analyzing behavioral habit information of the user in the store. For example, the analysis is used to determine which areas are preferred by most users, based on which the layout of the store system is optimized, and so on.

According to various embodiments, the information of the clothing items for try-on confirmed by the user and the identification information of the user can be determined in any suitable manner. The association relationship between the two can be sent to the first device in the back warehouse in any suitable manner as well. After receiving the association relationship information, the first device is configured to determine that the corresponding user needs to enter the fitting room for try-on. In one embodiment, after receiving the association relationship information, the first device is further configured to determine an occupied or vacant state of the fitting rooms. If there is a vacant fitting room, corresponding clothing items are prepared. Further, a fitting room system is configured further to assign a fitting room to the user, the information of which is obtained by the first device (e.g., the fitting room that the current user needs to enter). After the preparation is complete, the corresponding clothing items are delivered to the fitting room through a second door of the fitting room.

In some embodiments, the state of a fitting room is obtained in advance. If there is a fitting room confirmed as vacant, the system is configured to perform behavior predictions based on the state of a fitting cart of the user and traffic dynamic predictions (e.g., a global tracking technology, or the like) to make preparation in advance. After the user submits a try-on request, the preparation is completed within a relatively short period of time (e.g., about 1 minute). If all the fitting rooms are all occupied, the system is configured to perform dynamic planning based on the actual situation and needs of the user. For instance, the waiting time, clothing items in the fitting cart, the traffic dynamics, and so on, are analyzed to generate a fair queuing policy such that the whole waiting process for the fitting rooms achieves a maximized degree of fairness.

From the perspective of a user, the user tries on, once entering the fitting room, the selected clothing items, which are prepared from the back warehouse and are delivered into the fitting room via the second door of the fitting room. In some embodiments, and as shown in FIG. 1, the store system is further configured to include a third device (103), the details of which are described below.

In some embodiments, the third device (103) is configured to be deployed in the fitting room and to determine the identification information of the user who enters the fitting room. Based on the identification information, the third device is configured to request the information of the clothing items for try-on corresponding to the user, from a server, and output the information of the clothing items for try-on to a first display screen in the fitting room for display.

According to various embodiments, the identification information of the user is obtained in any suitable manners. For example, a graphic code for login is provided on the first display screen such that the user scans the graphic code using a corresponding client at device of the user (e.g., a mobile phone) to log in to the third device. The third device is configured to then request from the server the information of clothing items for try-on selected by the user based on the user identification information, and display the information of the clothing items for try-on at the first display screen.

Figure 3:
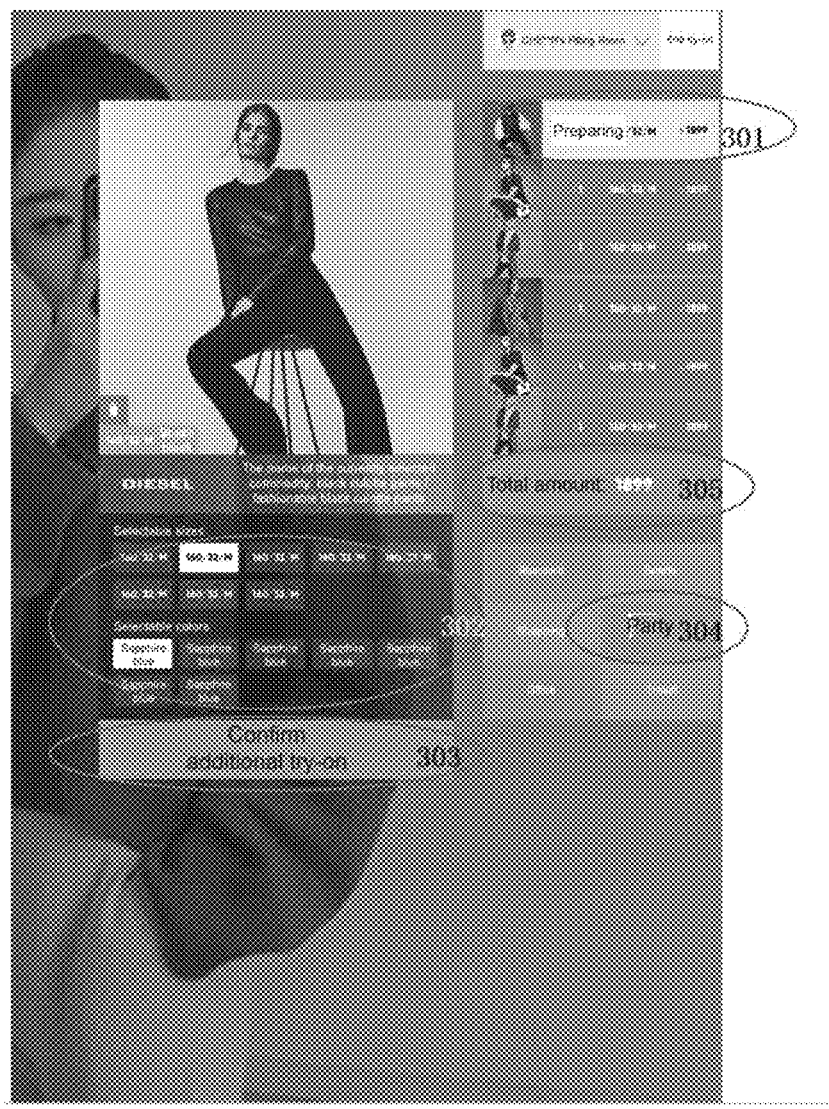
FIG. 3 is a block diagram illustrating an interface of a third device according to some embodiments of the disclosure.

FIG. 3 is a block diagram illustrating a user interface of the third device according to some embodiments of the disclosure. As shown herein, a list of clothing items for try-on is displayed in area 301 of the user interface. In some embodiments, the third device is further configured to query the first device to obtain item preparation status information corresponding to the user. If the preparation is not completed, prompt informing of the wait for the preparation is provided. For example, a status of "Preparing" is displayed for an item of the list at 301.

In one embodiment, after a clothing item is delivered to the fitting room, the user tries it on, during which if the clothing item does not fit, or the color or size needs to be changed, the user further selects for clothing items via the first display screen in the fitting room. This way, the third device is further configured to determine the clothing item being tried on based on the selection operation of the user, and provide information of selectable colors and/or sizes for the clothing item at, for example, area 302 of the interface of FIG. 3. Further, an operable option 303 for changing the color and/or size is further provided at the user interface of FIG. 3. After receiving a request via the operable option from the user, the third device is configured to provide the updated information to the first device such that the back warehouse re-prepares the item(s) and delivers them to the fitting room.

Further, in the process of the user trying on in the fitting room, recommendations of clothing items available in the store that match a clothing item being tried on are provided to the user. After the recommended clothing item is selected, the third device is further configured to provide information of the selected clothing item to the first device such that the back warehouse prepares and delivers the item(s) to the fitting room. In some other embodiments, after determining the clothing item being tried on, the third device is further configured to provide recommendation information, from the clothing items historically purchased by the user, that match the clothing item.

If the recommended matching clothing item is a historically purchased clothing item, the user cannot try on the matching clothing item in the current store. As such, in some embodiments, a virtual try-on effect is further be provided to the user. For example, in some implementations, the above-described first display screen is configured with a mirror screen to present a try-on effect of a clothing item dressed on the user. That is, the first display screen not only is used for displaying information but also function as a mirror. The user sees his/her own images at the first display screen, and during the meanwhile views recommendation information or the like. If interested in a recommended clothing item, the user selects the recommended clothing item. Next, the third device is further configured to determine in the recommendation information a selected matching clothing item to obtain the displaying content material information (e.g., a three-dimensional picture or the like, generated on a server in advance). The third device is further configured to display the content material based on an imaging position of the user at the mirror screen and the type of the matching clothing item, such as to provide a virtual try-on effect of the recommended matching clothing item on the user. For instance, when the user is currently trying on a jacket, the system recommends a pair of pants for the user, the pair of pants being a product that the user had purchased from an online store or physical (offline) store in the past. As such, the user views at the display screen not only how the jacket looks on him/her, but also the overall outfit style when matched with the pair of pants. That is, although the user is not actually wearing the pair of pants, the specific matched look is viewed at the display screen such that the user views the matching effect of the jacket and the pair of pants more intuitively.

In some embodiments, to better simulate an actual dressing look on the user when providing the virtual try-on effects, the position of the user's image at the first display screen needs to be determined. In other embodiments, information such as the height and body type of the user is also determined. This way, the positions where the virtual material information is to be displayed, and information such as the displaying length and width are determined. Without such information, misplacement of the virtual item or wrong-sized virtual item is rendered on the display screen. In one embodiment, a designated position mark is further provided on the floor of the fitting room, and a prompt is provided to the user via the first display screen such that, if the user wants to view the virtual try-on effect, the user is instructed to stand at the designated position. This way, the position and distance of the user relative to the first display screen are determined. Further, in some embodiments, information about the height, body type, and the like of the user is acquired via an apparatus such as a camera in the store. Generally, fitting rooms are not configured with any camera due to the concern of user privacy. However, as described above, the second device in the display area is configured with a camera such that information such as the height and physical characteristics of the user is collected via the second device, and in turn, provided to the third device. In one example, the third device is configured to obtain the corresponding information such as the user's height and physical characteristics based on the user profile information provided by a server. In another example, the third device is configured to approximately determine the height, physical characteristics, and so on, for the user based on the information such as the size selection of the clothing items from a shopping history of the user. After the position of the imaging content of the user rendered on the first display screen and the height and physical characteristics of the user are determined, the size and required displaying positions associated with the content material of a matching clothing item for display is calculated based on such information. Next, the virtual item is displayed based on the position. In some embodiments, the required displaying position is further determined based on the type of the matching clothing item (e.g., tops or pants, or the like).

In some embodiments, the first display screen is further configured to display ambiance information (e.g., a video or picture), which is provided to the user as selectable scene options. Based on the user's selection, the information associated with the scene is projected at the first display screen for display. For example, as shown at area 304 of the user interface in FIG. 3, a "Party" scene options provided for selection based on the user's needs, among other options s such as "Standard," "Sports," and "Office." In some embodiments, the user selects, via the first display screen or his/her own device, a saved personalized scene for a display to create the ambiance.

Further, in some embodiments, the lighting angle or the like in the fitting room is configured to be adjustable. In one embodiment, the third device is further configured to obtain the physical characteristic information of the user, based on which the lighting in the fitting room is adjusted. For example, the lighting position is adjusted based on the height of the user, and so on, such that the optimal lighting is achieved in the fitting room. In some embodiments, the scene is created with the assistance of a laser projection wall (or an LED background wall) to achieve a realistic scene effect as much as possible, helping the user make shopping decisions. Further, the lighting system is configured to help the user achieve great selfie-taking effects when taking selfie photos.

In some embodiments, when the user comes out of the fitting room at any time during the try-on in the fitting room, discusses with friends, and then returns to the fitting room, the fitting room is configured as remaining in an occupied state to prevent the entry of other users.

After the user finishes trying the clothing items, if the user determines to purchase some or all of the clothing items, payment is initiated at the third device. For example, an operable option 305 is configured at the user interface of FIG. 3. This way, the third device is further configured to provide an operable option for checking out the selected clothing items. When a check out request is received via the user selecting the operable option 305, a graphic code for payment is obtained from a corresponding server such that the user makes the payment by scanning the graphic code using a client corresponding to the server.

In some embodiments, the third device is further configured to, after the user completes try-on, sends the notification information to the first device for retrieving the tried-on clothing items. Before the clothing items are retrieved, the corresponding fitting room status is configured as a cleaning state. In one embodiment, an option such as "End Try-on" is provided at the interface of the third device. After the user completes the try-on and selected such an option, the third device is notified that the try-on completes.

In some embodiments, the fitting room is further configured to include a second display screen at an entrance to display the status information of the fitting room. For example, "Occupied," "Vacant," or "Cleaning" statuses can be displayed on the second display screen.

According to various embodiments of the disclosure, although the fitting room has two doors, the second door is configured with physical designs such that when the user is inside the fitting room, the back warehouse staff cannot enter the fitting room but can only deliver clothing items, via the second door. Further, an obstruction is provided at the delivery point to protect the user's privacy. After the user completes the try-on, the back warehouse staff can enter the fitting room and perform work such as retrieving the clothing items, and rearranging relevant items, etc. In one embodiment, the afore-described objective is achieved in any suitable manner. For example, the second door is configured with two states. In the first state, the maximum opening extent of the second door is restricted such that only clothing items for try-on can be delivered into the fitting room, and in the state of opening to this extent, people outside the second door is not able to see the inside of the fitting room. In the second state, the restriction of the maximum opening extent of the second door is removed to enable staff from the back warehouse to enter the fitting room. Any suitable techniques can be applied to restrict the maximum opening extent of the second door. For example, the principle of shutters is used to implement the restriction on the operation of the second door. In some implementations, a controller is further provided in the fitting room to switch the state of the second door based on the status of the fitting room. For example, when the fitting room is occupied, the second door is switched to the first state; and after a try-on is completed, the second door is switched to the second state, and so on. In some implementations, a window is further provided at the second door and configured with a sight obstruction, where when the fitting room is in the occupied state, the second door is in a closed state, and the clothing items for try-on is delivered into the fitting room through the window.

Further, in some embodiments, a multi-user fitting room is provided for authorizing a plurality of users to enter/exit within an appointment based time period. In one example, a multi-user fitting room is configured as a large fitting room having a plurality of amenities such as a laser projection wall (or an LED background wall), an interactive mirror screen, a lighting system, an audio and video system, a sofa, a small bar, and a small catwalk, as well as a small changing area to host activities such as multi-user interactive entertainment, small catwalk modeling, show, and professional photographing, and the like. In one embodiment, an appointment (for a time and a fitting room) is made via a corresponding client in advance to authorize a certain number of group members (e.g., a number limited based on the size of the multi-user interactive fitting room) for entry. During the appointment-based period of time, the authorized users (e.g., group members) can freely enter and/or exit the multi-user interactive fitting room. Further, in one example, the laser projection wall (or LED background wall) of the multi-user interactive fitting room is further configured to support multi-screen interaction with a user device (e.g., a mobile phone). For instance, via a user's mobile phone, a personalized ambiance is created, a video is played, and the audio and video system supporting Bluetooth audio access is configured to connect to the user's mobile phone to play music.

According to various embodiments of the disclosure, after clothing items for try-on are confirmed in a display area, the information of the clothing items for try-on is sent to a first device in a back warehouse such that back warehouse staff can prepare the clothing items. Further, a fitting room is configured with two doors, one for a user to enter/exit, and the other for delivering the selected clothing items for try-on. This way, as clothing items in the display area are not to be directly brought into the fitting room, the clothing items remain on display in the display area for other users to browse later on, without the need to increase the number of floor samples in the display area. Further, the staff in the back warehouse is dedicated to item preparations, doing away with salespersons in the front store helping users to locate the desired colors, sizes, and so on, thereby achieving higher efficiency.

In some embodiments, the disclosure provides a fitting room. In one embodiment, the fitting room is configured to include a first door and a second door. The first door is configured for a user to enter/exit the fitting room, and the second door is configured for delivering clothing items for try-on, corresponding to the user, from the back warehouse area to the fitting room.

In some embodiments, the second door is configured with a first state and a second state. In the first state, the maximum opening extent of the second door is restricted, such that only clothing items for try-on can be delivered into the fitting room. In the second state, the restriction of the maximum opening extent of the second door is removed to enable staff from the back warehouse to enter the fitting room.

Alternatively, the fitting room is further configured to include a controller, which is configured to switch the state of the second door based on the status of the fitting room.

In some implementations, the second door is further configured with a window having a sight obstruction. When the fitting room is in an occupied state, the second door is in a closed state, and the clothing items for try-on are delivered into the fitting room through the window.

In some implementations, the fitting room further includes a third device. The third device is deployed in the fitting room and configured to determine the identification information of the user entering the fitting room. The third device is configured to request the information of the clothing items for try-on associated with the user from a server, based on the identification information, and to display the information of the clothing items for try-on at a display screen. In some embodiments, the display screen is configured as a mirror screen, functioning as a dressing mirror while displaying information. Further, the fitting room is further configured to include another display screen at an entrance to display the state information of the fitting room. For example, such a state includes "Occupied," "Vacant," or "Cleaning," and the like.

Other functionalities of the third device are substantially similar to those above described, the details of which is not repeated herein.

Figure 4:
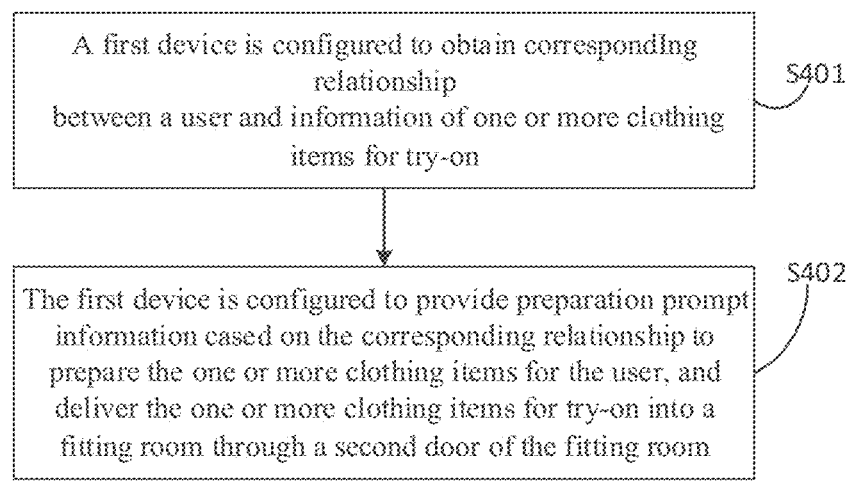
FIG. 4 is a flow diagram illustrating a method for processing try-on information according to some embodiments of the disclosure.

FIG. 4 is a flow diagram illustrating a method for processing information of clothing items for try-on from the perspective of the first device in a back warehouse, according to some embodiments of the disclosure. In one embodiment, the method includes the following steps.

Step S401: the first device is configured to obtain the corresponding relationship between a user and the information of clothing items for try-on.

Step S402: the first device is configured to provide preparation prompt information based on the corresponding relationship to prepare the clothing item for the user, and to deliver the clothing items for try-on into a fitting room through a second door of the fitting room. The fitting room further includes a first door configured for the user to enter/exit the fitting room.

Figure 5:
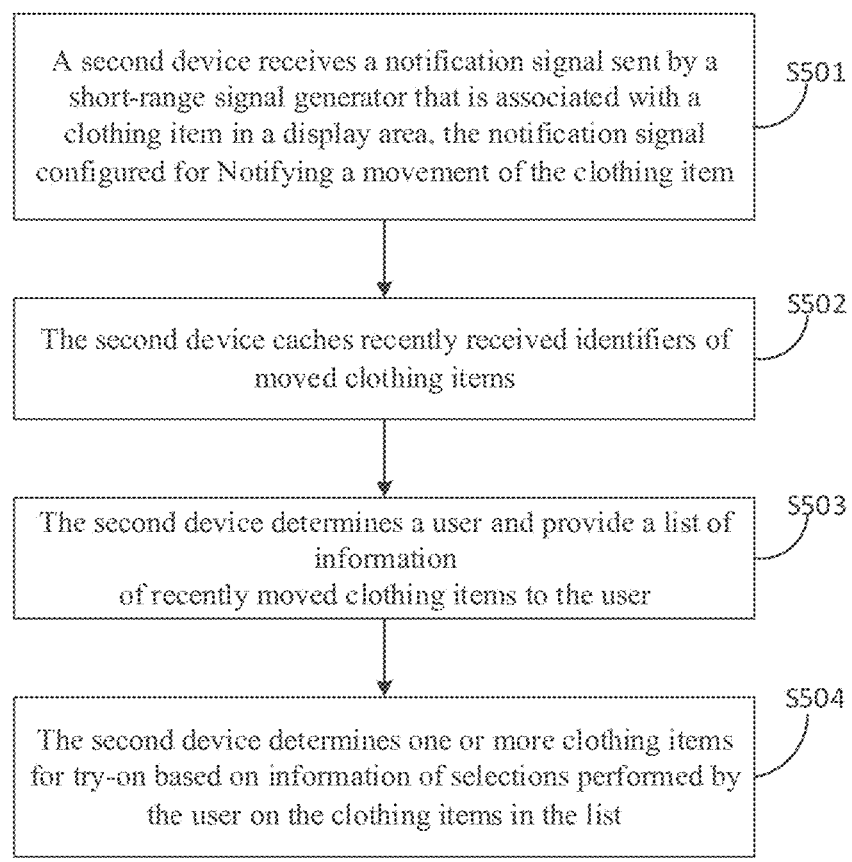
FIG. 5 is a flow diagram illustrating a method for processing try-on information according to some embodiments of the disclosure.

FIG. 5 is a flow diagram illustrating a method for processing information of clothing items for try-on from the perspective of a second device in a display area, according to some embodiments of the disclosure. In one embodiment, the method includes the following steps.

Step S501: the second device is configured to receive a notification signal sent by a short-range signal generator associated with a clothing item in a display area, the notification signal configured for notifying a movement of the associated clothing item.

Step S502: the second device is configured to cache the recently received identifiers of moved clothing items.

Step S503: the second device is configured to determine a user and provide a list of the information of the recently moved clothing items to the user.

Step S504: the second device is configured to determine clothing items for try-on based on the selections performed by the user on the clothing items in the list.

In implementations, thumbnail information of each clothing item is provided in a list of the clothing item information. After one of the clothing items is selected, the detailed information of the clothing item is provided. In one example, the detailed information includes an enlarged picture, the price, and/or discount options for the clothing item.

In one embodiment, to determine the clothing items for try-on, an operable option is provided for adding a clothing item selected in the list of the clothing item information to a collection of clothing items for try-on. After an adding request is received via the operable option, choices of colors and/or sizes are provided such that the selected clothing item and selected color(s) and/or size(s) are added to the information of the clothing items for try-on.

Further, the second device is further configured to provide recommended matching information corresponding to the clothing item selected in the clothing item information list. In one embodiment, the matching information includes clothing items available in the store that match the selected clothing item. In one embodiment, map information on the display positions of the matching clothing items in the store is further be provided. In other embodiments, the matching information further includes historically purchased clothing items that match the selected clothing item.

In some embodiments, the second device is further configured to provide an operable option for checking-out the selected clothing item. When a check-out request is received via the user's selection of the operable option, a request is sent to a corresponding server to obtain a graphic code for payment. This way, the user makes a payment by scanning the graphic code via a client corresponding to the server.

Further, an identity of the user and the information of the clothing items for try-on are further provided to the first device based on a request to enter the fitting room from the user such that the staff of the back warehouse can prepare the clothing items.

Alternatively, in some embodiments, a corresponding relationship between the identity of the user and the confirmed clothing items for try-on is submitted to the server for saving.

Figure 6:
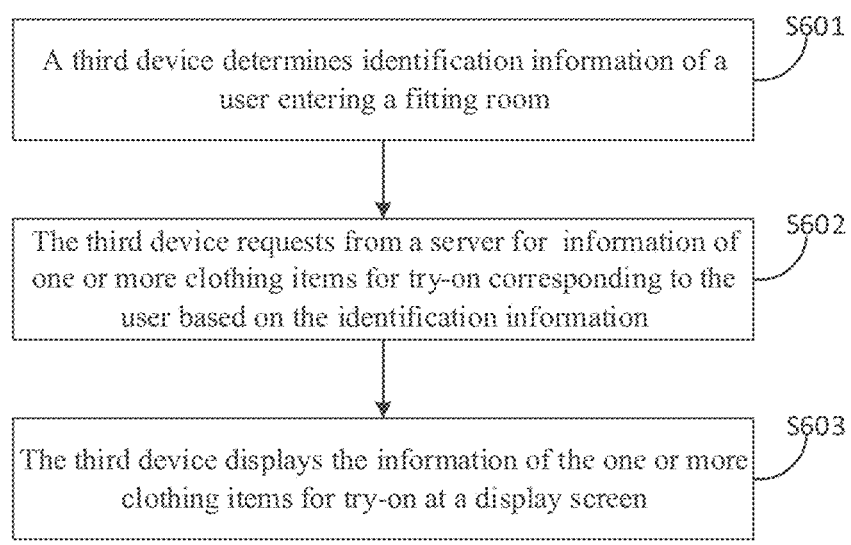
FIG. 6 is a flow diagram illustrating a method for processing try-on information according to some embodiments of the disclosure.

FIG. 6 is a flow diagram illustrating a method for processing information of clothing items for try-on from the perspective of a third device in a fitting room, according to some embodiments of the disclosure. In one embodiment, the method includes the following steps.

Step S601: the third device is configured to determine the identification information of a user entering a fitting room.

Step S602: the third device is configured to request from a server to obtain the information of clothing items for try-on corresponding to the user based on the identification information.

Step S603: the third device is configured to display the information of the clothing items for try-on through a display screen.

In implementation, the third device is further configured to query the first device to obtain a clothing item preparation state corresponding to the user. If the preparation is not completed, a prompt of waiting for preparation is provided by the third device.

Further, the third device is configured to determine a clothing item that is currently being tried on such that selectable colors and/or sizes for the clothing item, as well as an operable options for changing a color and/or size are provided. After a request is received via the user's selection of the operable option(s), the third device is configured to provide the updated information to the first device such that the back warehouse re-prepares the item(s) and delivers them to the fitting room.

In one embodiment, a clothing item that is currently being tried on is determined, and the recommendation information of clothing items available in the store that matches the clothing item is provided. After the recommended clothing item is selected, the information of the selected clothing item is provided to the first device such that the back warehouse prepares and delivers the corresponding items to the fitting room.

In other embodiments, when a clothing item being tried on is determined, the recommendation information is provided from the historically purchased clothing items of the user that match the clothing item.

In one embodiment, the third device is configured to determine a selected matching clothing item in the recommendation information, based on which the displaying content material corresponding to the selected matching clothing item is obtained. Next, the third device is configured to display the content material, based on an imaging position of the user at the mirror screen and the type of the matching clothing item, to provide a virtual effect of trying-on the matching clothing item.

In some embodiments, after a virtual try-on request is received, a prompt is further provided to instruct the user to stand at a marked position in the fitting room. This way, the imaging position of the user at the mirror screen, and the position to display the virtual clothing item (e.g., a picture corresponding to the matching clothing item) at the mirror screen, are both determined.

Further, in some embodiments, physical characteristic information of the user is further obtained to determine a required displaying size for the virtual item (e.g., the picture corresponding to the matching clothing item) based on the physical characteristic information.

Figure 7:
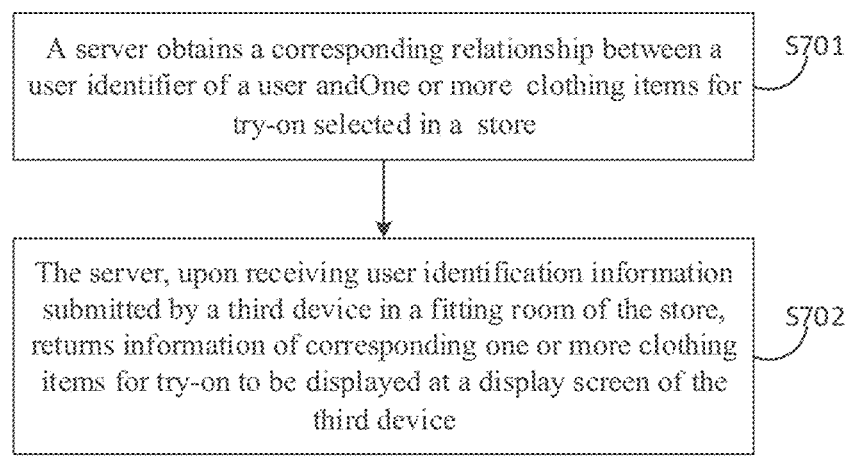
FIG. 7 is a flow diagram illustrating a method for processing try-on information according to some embodiments of the disclosure.

FIG. 7 is a flow diagram illustrating a method for processing information of clothing items for try-on from the perspective of a server associated with an online sale system in co-operation with the store system, according to some embodiments of the disclosure. In one embodiment, the method includes the following steps.

Step S701: the server is configured to obtain a corresponding relationship between a user identifier associated with a user and clothing items for try-on selected in a store.

Step S702: the server is configured to, upon receiving the user identification information submitted by a third device in a fitting room of the store, return the information of corresponding clothing items for try-on to be displayed at a display screen of the third device.

In implementations, the server is further configured to receive, from the third device, a request to generate an order. The request includes the identification information of the corresponding clothing items, and merchandise delivery information, based on which an order is generated. In one example, the delivery information includes options such as in-store pick-up, or delivery to a designated receiving address.

Functionalities not described with reference to FIG. 7 are substantially similar to those of FIGS. 1-6, the details of which are not repeated herein.

Figure 8:
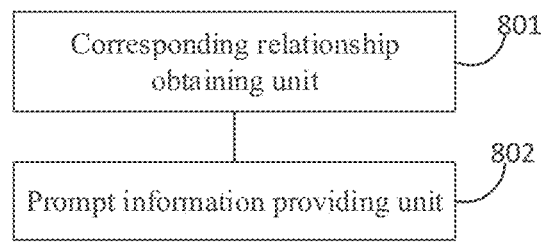
FIG. 8 is a block diagram illustrating an apparatus for processing try-on information according to some embodiments of the disclosure.

FIG. 8 is a block diagram illustrating an apparatus for processing information of clothing items for try-on according to some embodiments of the disclosure. In one embodiment and as shown herein, the apparatus, applied at a first device, includes a corresponding relationship obtaining unit (801), and a prompt information providing unit (802).

The corresponding relationship obtaining unit (801) is configured to obtain the corresponding relationship between a user and information of clothing items for try-on.

The prompt information providing unit (802) is configured to provide the preparation prompt information based on the corresponding relationship to prepare items for the user, and to deliver the clothing items for try-on into a fitting room through a second door of the fitting room, which further includes a first door configured for a user to enter/exit the fitting room.

Figure 9:
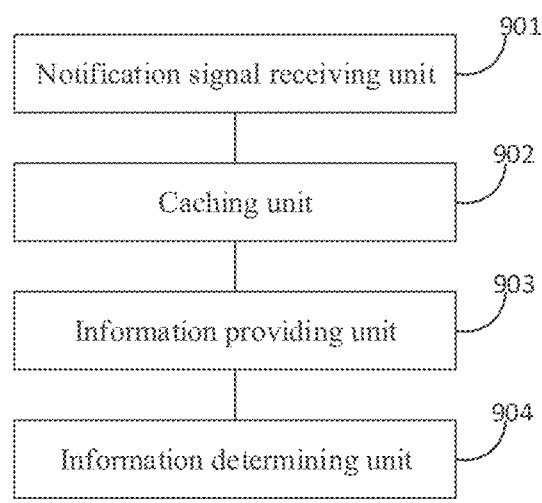
FIG. 9 is a block diagram illustrating an apparatus for processing try-on information according to some embodiments of the disclosure.

FIG. 9 is a block diagram illustrating an apparatus for processing information of clothing items for try-on according to some embodiments of the disclosure. In one embodiment and as shown herein, the apparatus, applied at a second device, includes a notification signal receiving unit (901), a caching unit (902), an information providing unit (903), and an information determining unit (904).

The notification signal receiving unit (901) is configured to receive a notification signal sent by a short-range signal generator associated with a clothing item in a display area, the notification signal configured for prompting a movement of the associated clothing item.

The caching unit (902) is configured to cache the recently received identifiers of the moved clothing items.

The information providing unit (903) is configured to determine a user and to provide a list of information of the recently moved clothing items to the user.

The information determining unit (904) is configured to determine the clothing items for try-on based on the selections performed by the user on the clothing items of the list.

In one embodiment, the information providing unit (903) is further configured to provide thumbnail information for each clothing item in the clothing item information list.

In one embodiment, the apparatus further includes a detailed information providing unit configured to, after one of the clothing items is selected, provide the detailed information regarding the clothing item. The detailed information includes, for example, enlarged picture information, price and/or discount options information for the clothing item.

In one embodiment, the information determining unit (904) is further configured to provide an operable option for adding a clothing item selected from the clothing item information list to a collection of clothing items for try-on. After an adding request is received via the operable option, the information determining unit (904) is further configured to provide selectable color and/or size information, and add the selected clothing item with the selected color and/or size to the information for the clothing items for try-on.

In one embodiment, the apparatus further includes a matching information recommendation unit configured to provide recommended matching information for the clothing item selected in the clothing item information list.

In one example, the matching information includes clothing items available in the store that match the selected clothing item. In this scenario, the apparatus further includes a map information providing unit configured to provide the map information of the display positions of the matching clothing items in the store.

In another example, the matching information further includes historically purchased clothing items that match the selected clothing item.

In one embodiment, the apparatus further includes a check-out option providing unit configured to provide operable options for check-out the selected clothing item. When a check-out operation request is received via the operable option, the check-out option providing unit is further configured to request from a corresponding server to obtain a graphic code for a payment such that the user makes payment by scanning the graphic code with a client corresponding to the server.

In one embodiment, the apparatus further includes an information transfer unit configured to provide the identity information of the user and the information of the clothing items for try-on to the first device based on a request for entering the fitting room submitted by the user such that the back warehouse prepares the items.

In one embodiment, the apparatus further includes an information submitting unit configured to submit a corresponding relationship between the identity information of the user and the clothing items for try-on to the server for saving.

Figure 10:
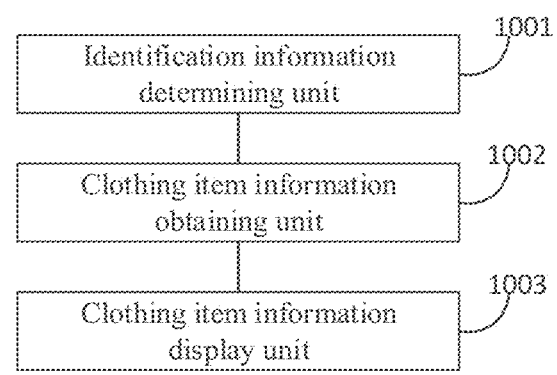
FIG. 10 is a block diagram illustrating an apparatus for processing try-on information according to some embodiments of the dis

FIG. 10 is a block diagram illustrating an apparatus for processing information of clothing items for try-on according to some embodiments of the disclosure. In one embodiment and as shown herein, the apparatus, applied at a third device, includes an identity information determining unit (1001), a clothing item information obtaining unit (1002), and a clothing item information display unit (1003).

The identity information determining unit (1001) is configured to determine the identity information of a user entering a fitting room.

The clothing item information obtaining unit (1002) is configured to request from a server to obtain the information of clothing items for try-on associated with the user based on the identity information.

The clothing item information display unit (1003) is configured to display the information of the clothing items for try-on at a display screen.

In one embodiment, the apparatus further includes an item preparation state information prompt unit configured to query the first device to obtain the item preparation state information corresponding to the user. If the preparation is not completed, the item preparation state information prompt unit is configured to provide the prompt information indicating a wait for preparation.

In one embodiment, the apparatus further includes a change option providing unit configured to determine a clothing item that is being currently tried on, and to provide selectable color and/or size information for the clothing item as well as operable option(s) for changing colors and/or sizes for the clothing item.

In one embodiment, the apparatus further includes a change information transfer unit configured to, after a request is received via the operable option(s), provide the changed option information to the first device such that the back warehouse re-prepares the items and delivers them to the fitting room.

In one embodiment, the apparatus further includes a first recommendation unit configured to determine a clothing item currently being tried on, and to provide the recommendation information for clothing item(s) available in the store that match the clothing item.

In one embodiment, the apparatus further includes a recommended clothing item information transfer unit configured to, after the recommended clothing item is selected, provide the information regarding the selected clothing item to the first device such that the back warehouse prepares and delivers the corresponding items to the fitting room.

In one embodiment, the apparatus further includes a second recommendation unit configured to determine a clothing item currently being tried on, and to provide the recommendation information for historically purchased clothing items of the user that match the clothing item.

In one embodiment, the apparatus further includes a matching clothing item determining unit, a display material obtaining unit, and a virtual try-on effect providing unit.

The matching clothing item determining unit is configured to determine a matching clothing item selected from the recommendation information.

The display content material obtaining unit is configured to obtain the content materials for displaying the content corresponding to the matching clothing item.

The virtual try-on effect providing unit is configured to display the content material based on an imaging position of the user at the mirror screen and the type of the matching clothing item to provide a virtual try-on effect of the matching clothing item.

In one embodiment, the apparatus further includes a prompt information providing unit configured to, after a virtual try-on request is received, provide the prompt information to instruct the user to stand at a marked position in the fitting room such that to determine the imaging position of the user at the mirror screen and a position where the content (e.g., picture) corresponding to the matching clothing item needs to be displayed.

The characteristic information obtaining unit is configured to obtain the physical characteristics information of the user to determine a required displaying size for the content (e.g., picture) corresponding to the matching clothing item based on the physical characteristic information.

Figure 11:
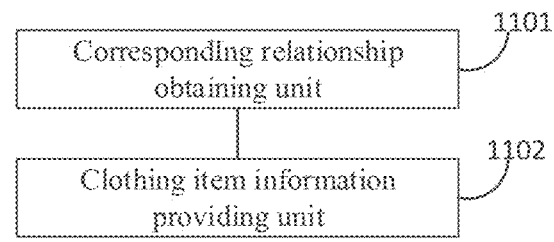
FIG. 11 is a block diagram illustrating an apparatus for processing try-on information according to some embodiments of the disclosure.

FIG. 11 is a block diagram illustrating an apparatus for processing information of clothing items for try-on according to some embodiments of the disclosure. In one embodiment and as shown herein, the apparatus, applied at a server, includes a corresponding relationship obtaining unit (1101), and a clothing item information providing unit (1102).

The corresponding relationship obtaining unit (1101) is configured to obtain the corresponding relationship between a user identifier associated with a user and clothing items for try-on selected in a store.

The clothing item information providing unit (1102) is configured to, upon receiving the user identification information submitted by a third device in a fitting room of the store, return the information of corresponding clothing items for try-on, the information to be displayed at a display screen of the third device.

In one embodiment, the apparatus further includes an order request receiving unit configured to receive an order generation request submitted by the third device, the request including the identification information of the clothing items for purchasing and the pick-up option information.

In one embodiment, the apparatus further includes an order generation unit configured to generate an order based on the request.

In one example, the pick-up option information includes in-store item pick-up, or delivery to a designated receiving address.

In some embodiments, the disclosure further provides a computer system. The system includes one or more processors; and a memory associated with the one or more processors. The memory is configured to store program instructions that, when read and executed by the one or more processors, instruct the computer system to perform the following steps.

Step 1: receiving a notification signal sent by a short-range signal generator that is associated with a clothing item in a display area, the notification signal configured for notify a movement of the associated clothing item.

Step 2: caching recently received identifiers associated with the moved clothing items.

Step 3: determining a user and providing a list of information of the recently moved clothing items.

Step 4: determining the clothing items for try-on based on the selections by the user on the clothing items in the list, and establishing a corresponding relationship between the user and information of the clothing items for try-on. The corresponding relationship is configured to be provided to a first device in a back warehouse of a store to prepare items, and the prepared items are delivered to a fitting room via a second door of the fitting room.

Figure 12:
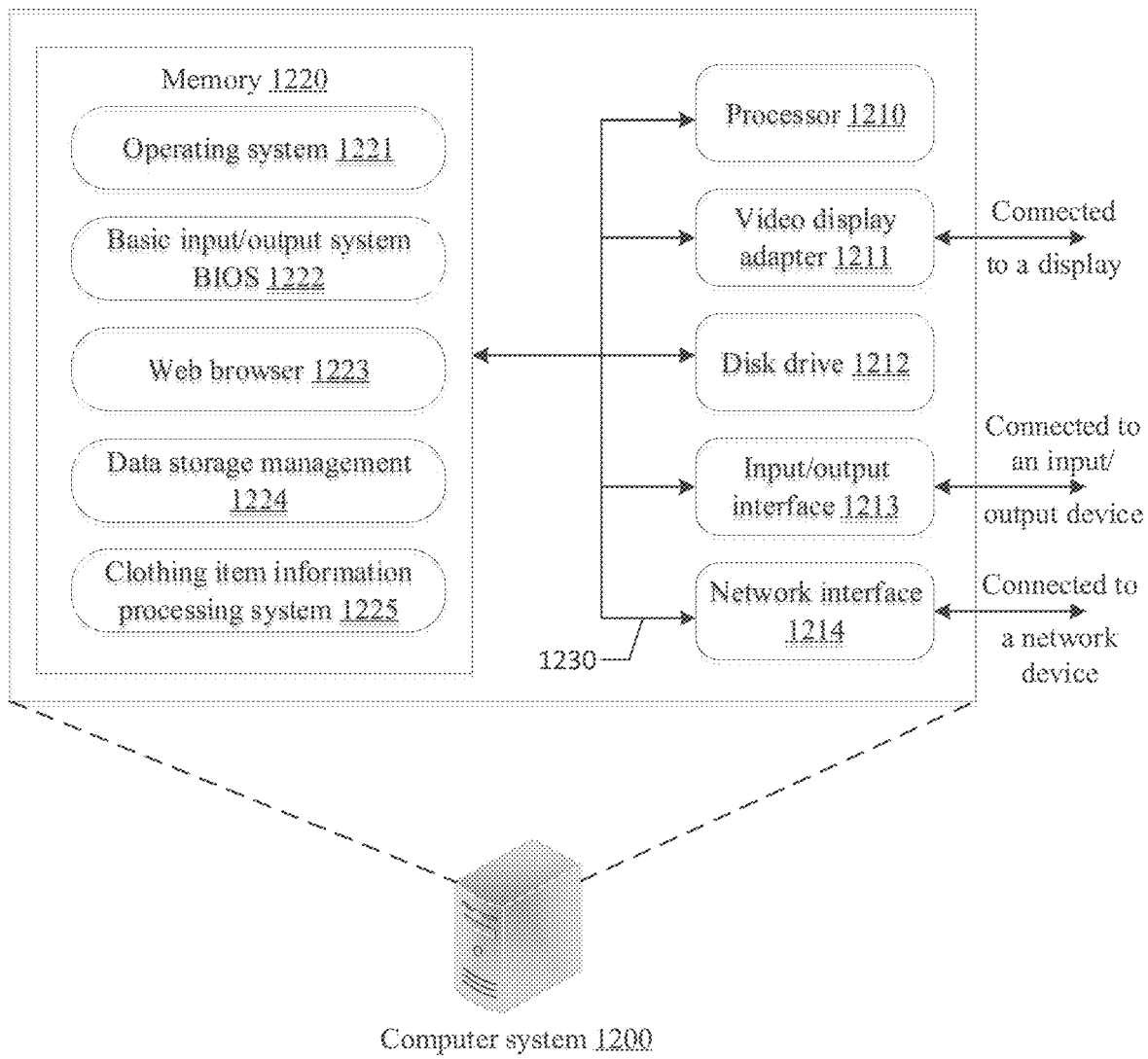
FIG. 12 is a block diagram illustrating a computing system according to some embodiments of the disclosure.

FIG. 12 is a block diagram illustrating an exemplary architecture of a computer system, according to some embodiments of the disclosure. In some embodiments and as shown herein, the computer system includes a processor (1210), a video display adapter (1211), a disk drive (1212), an input/output interface (1213), a network interface (1214), and a memory (1220). The processor (1210), video display adapter (1211), disk drive (1212), input/output interface (1213), network interface (1214), and memory (1220) are communicatively connected to each other through a communication bus (1230).

The processor (1210) is implemented using a general-purpose CPU (Central Processing Unit), a microprocessor, an application specific integrated circuit (ASIC), or one or a plurality of integrated circuits, and configured to execute relevant programs to implement the technical solutions provided in the disclosure.

The memory (1220) is implemented in the form of a ROM (Read Only Memory), a RAM (Random Access Memory), a static storage device, a dynamic storage device, or the like. The memory (1220) may store an operating system (1221) used for controlling running of the computer system (1200), and a basic input/output system (BIOS) used for controlling low-level operation of the computer system (1200). In addition, the memory (1220) may further store a web browser (1223), a data storage management system (1224), a clothing item information processing system (1225), and so on. The clothing item information processing system (1225) includes an application in this embodiment of the disclosure that implements the above-described methods, processes, steps and operations. When the technical solutions provided in the disclosure are implemented by using software or firmware, relevant program code is stored in the memory (1220) and invoked and executed by the processor (1210).

The input/output interface (1213) is configured to be connected to an input/output module so as to input and output information. The input/output module may be configured as a component in a device (not shown in the figure), or may be externally connected to the device to provide a corresponding function. The input device may include a keyboard, a mouse, a touch screen, a microphone, various sensors, and so on, and the output device may include a display, a loudspeaker, a vibrator, an indicator, and so on.

The network interface (1214) is configured to be connected to a communication module (not shown in the figure) to implement communication interaction between the local device and other devices. The communication module may implement communication in a wired manner (for example, through a USB or a network cable), or may implement communication in a wireless manner (for example, through a mobile network, WIFI, or Bluetooth).

The bus (1230) includes a path that transmits information between various components (for example, the processor (1210), the video display adapter (1211), the disk drive (1212), the input/output interface (1213), the network interface (1214), and the memory (1220)) of the device.

In addition, the computer system (1200) may further obtain, from a virtual resource object retrieval condition information database (1241), information of a specific retrieval condition for use in condition judgment and so on.

It should be noted that although only the processor (1210), the video display adapter (1211), the disk drive (1212), the input/output interface (1213), the network interface (1214), the memory (1220), and the bus (1230) are shown in the above-described device, in implementations, the device may further include other components necessary for normal running. Furthermore, those skilled in the art can understand that the aforementioned device may also include only the components necessary to implement the solutions of the disclosure, without the need to include all the components shown in the figure.

Through the above description of the embodiments, those skilled in the art can clearly understand that the disclosure can be implemented by means of software plus a necessary universal hardware platform. Based on such understanding, the essence of the technical solutions of the disclosure or the part that contributes to the prior art may be embodied in the form of a software product. The computer software product may be stored in a storage medium such as a ROM/RAM, a magnetic disk, or an optical disc, and include several instructions to instruct a computer device (which may be a personal computer, a server, a network device, or the like) to perform the methods described in the embodiments of the disclosure or in some parts of the embodiments.

The embodiments in the present specification are described in a progressive manner, and for identical or similar parts between different embodiments, reference may be made to each other so that each of the embodiments focuses on differences from other embodiments. Because the systems or system embodiments are substantially similar to the method embodiments, the description for the systems or system embodiments is relatively concise; and reference can be made to the description of the method embodiments for related parts. The systems and system embodiments described above are merely exemplary. The units described as separate parts may or may not be physically separated; and the components shown as units may or may not be physical units. That is, the components may be located in one place or may be distributed among a plurality of network units. The objective of the solution of this embodiment is implemented by selecting some or all of the modules based on actual requirements. Those of ordinary skill in the art can understand and implement the disclosure without significant efforts.

The store system and the method and apparatus for processing information of clothing items for try-on in the disclosure are described in detail above, and the principles and implementation manners of the disclosure are described by using specific examples herein. The above description of the embodiments is merely used to facilitate understanding of the disclosure and the core idea thereof. Meanwhile, for those of ordinary skill in the art, modifications may be made to the specific implementations and application scopes based on the idea of the disclosure. In view of the above, the content of this specification should not be construed as any limitation to the disclosure.

The invention claimed is:

1. A store system comprising:
a fitting room, the fitting room comprising a first door and a second door, the first door configured for a user to enter and exit, and the second door configured for delivering one or more candidate clothing items for try-on; and
a first device, configured to:
obtain a relationship between the user and information of one or more clothing items, the relationship established after the user interacts with the one or more clothing items displayed in a clothing item display area of the store;
display, based on the relationship, item preparation prompt information, the item preparation prompt information comprising an instruction to prepare the one or more candidate clothing items for the user;
detect that the user has entered the fitting room; and
deliver the one or more candidate clothing items to the user via the second door of the fitting room.

2. The store system of claim 1, further comprising:
a second device, the second device deployed in the clothing item display area of the store, the second device configured to identify the user and determine the information of the one or more clothing items corresponding to the user.

3. The store system of claim 2, the second device further comprising a biometric information collection apparatus configured to collect biometric information of the user to determine identification information of the user based on a pre-configured association relationship between the biometric information and the identification information.

4. The store system of claim 3, the biometric information collection apparatus further comprising a camera, and the second device further configured to collect physical characteristic information of the user via the camera, the second device further configured to recommend attributes of the one or more clothing items to the user, the attributes comprising an attribute selected from the group consisting of color or size of the one or more clothing items.

5. The store system of claim 2, further comprising:
a magnetic security tag device, the magnetic security tag device disposed on a clothing item displayed in the display area, and comprising a motion sensor and a short range signal generator, the motion sensor configured to sense a movement of the clothing item and transmit a notification signal to the second device via the short range signal generator, the notification signal including an identifier of the clothing item; and
the second device further comprising:
a short range signal receiver configured to receive the notification signal to determine the identifier of the clothing item and cache identifiers of recently moved clothing items; and
a display screen configured to, after the user is identified, provide a list of information regarding the recently moved clothing items at the display screen, and determine the one or more clothing items based on the user's operations on the clothing items in the list.

6. The store system of claim 5, the second device further configured to provide recommended matching information for a clothing item selected from the list.

7. The store system of claim 5, the clothing item display area comprising a plurality of sub-areas, each sub-area being in signal isolation from each other and corresponding to one unit of the second device; and the short range signal receiver at the unit of the second device configured to receive a clothing item movement notification signal in a respective sub-area of the display area.

8. The store system of claim 2, the second device further configured to obtain information regarding clothing items historically purchased by the user, and provide, based on clothing items displayed in the store, information of clothing items matching the historically purchased clothing items.

9. The store system of claim 2, the second device further configured to:
provide an operable option for checking out selected clothing items; and
request, from a corresponding server, upon receiving a check out request via the operable option, a graphic code for a payment such that the user makes the payment by scanning the graphic code via a client corresponding to the server.

10. The store system of claim 2, the second device further configured to provide identification information of the user and the information of the one or more clothing items to the first device based on a user's request to enter the fitting room submitted by the user.

11. The store system of claim 2, the second device further configured to submit the relationship between identification information of the user and the one or more clothing items to a server for storing, the server comprising a registration server configured to register the user and provide the identification information upon querying; and
the store system further comprising:
a first electronic identification card read/write device, deployed at an entrance of the store and configured to obtain the identification information of the user, and write the identification information to an electronic identification card; and
a second electronic identification card read/write device, deployed at an entrance of an fitting room area and configured to:
read from the electronic identification card carried by the user to determine the identification information of the user; and
obtain the information of the one or more clothing items from the server, and provide the identification information of the user and the information of the one or more clothing items to the first device to notify for preparing the one or more candidate clothing items.

12. The store system of claim 11, the electronic identification card further comprising a short range signal transmitting device configured to transmit a signal including the identification information of the user after the identification information of the user is written; and
the store system further comprising:
a short range signal receiving device, deployed at a plurality of positions in the store configured to perform indoor positioning on the user based on the signal transmitted by the electronic identification card and analyze behavioral habits of the user in the store based on the indoor positioning.

13. The store system of claim 1, the store system further comprising:
a third device, deployed in the fitting room and configured to:
determine identification information of the user entering the fitting room;
request, from a server, the information of the one or more clothing items corresponding to the user, based on the identification information; and
output the information of the one or more clothing items to a first display screen in the fitting room for display.

14. The store system based on claim 13, the third device further configured to:
determine a clothing item currently being tried on; and
provide, from historically purchased clothing items of the user, recommendation information of items that match the clothing item.

15. The store system of claim 14, the first display screen comprising a mirror screen configured to present a try-on effect of a clothing item dressed on the user; and the third device further configured to:
determine a matching clothing item selected from the recommendation information;
obtain information of displaying content material for the matching clothing item; and
display the displaying content material based on an imaging position of the user at the mirror screen and a type of the matching clothing item to provide a virtual try-on effect of the matching clothing item dressed on the user.

16. The store system of claim 15, the fitting room further comprising a position marked on a floor of the fitting room; and the third device further configured to:
provide, after a virtual try-on request is received, prompt information to instruct the user to stand at the marked position in the fitting room;
determine the imaging position of the user at the mirror screen; and
determine a position where a picture corresponding to the matching clothing item is to be displayed.

17. The store system of claim 13, the third device further configured to:
provide selectable scene information; and
display information associated with selected scene information at the first display screen.

18. The store system of claim 13, the third device further configured to:
obtain physical characteristic information of the user; and
adjust lighting in the fitting room based on the physical characteristic information.

19. A method comprising:
obtaining, via a processor, a relationship between a user and information of one or more clothing items, the relationship established after the user interacts with the one or more clothing items displayed in a clothing item display area of a store;
displaying, by the processor based on the relationship, item preparation prompt information, the item preparation prompt information comprising an instruction to prepare candidate one or more clothing items for the user;
detecting, via a processor, that the user has entered a fitting room of the store via a first door; and delivering, via a processor, the one or more candidate clothing items to the user via a second door of the fitting room.

20. A non-transitory computer-readable storage medium for tangibly storing computer program instructions capable of being executed by a computer processor, the computer program instructions defining the steps of:

obtaining a relationship between a user and information of one or more clothing items the relationship established after the user interacts with the one or more clothing items displayed in a clothing item display area of a store;

displaying, based on the relationship, item preparation prompt information, the item preparation prompt information comprising an instruction to prepare one or more candidate clothing items for the user;

detecting that the user has entered a fitting room of the store via a first door; and delivering the one or more candidate clothing items to the user via a second door of the fitting room.

* * * * *